Aug. 12, 1952

G. L. EATON 2,606,828

METHOD AND APPARATUS FOR THE MANUFACTURE
OF CARBURETED WATER GAS

Filed Nov. 13, 1947

Inventor:
Gerald L. Eaton
by his Attorneys
Howson & Howson

Aug. 12, 1952 G. L. EATON 2,606,828
METHOD AND APPARATUS FOR THE MANUFACTURE
OF CARBURETED WATER GAS
Filed Nov. 13, 1947 2 SHEETS—SHEET 2

Inventor:
Gerald L. Eaton
by his Attorneys
Howson &
Howson

Patented Aug. 12, 1952

2,606,828

UNITED STATES PATENT OFFICE 2,606,828

METHOD AND APPARATUS FOR THE MANUFACTURE OF CARBURETED WATER GAS

Gerald L. Eaton, Lansdowne, Pa., assignor to United Engineers & Constructors Inc., Philadelphia, Pa., a corporation of Delaware Application November 13, 1947, Serial No. 785,672

15 Claims. (Cl. 48—205)

The present invention relates to a method of and apparatus for the manufacture of carburetted water gas. Its use is particularly advantageous in the manufacture of carburetted water gas wherein the enriching oil is a heavy oil or residuum which yields a relatively large proportion of coke on vaporization.

In the usual manufacture of carburetted water gas, an ignited bed of solid fuel, such, for example, as coke, is alternately blasted with air and steam in a cyclic operation. In the air blasting step of the cycle, termed the "blow," the temperature of the fuel bed is raised by combustion and heat is stored therein, for use in the steam blasting portion of the cycle, termed the "run," in which blue water gas is formed by the endothermic reaction of the steam with the hot carbon.

During the blow, the producer gas formed by the upward air blasting of the fuel bed with primary air is ignited with secondary air, and the burning gases are led through chambers containing heat storage material in which their heat is stored. During the run, at least a portion of the blue water gas issuing from the fuel bed is led along this path of stored heat and is carburetted with hydrocarbon oil, such as petroleum oil, which is vaporized and cracked to oil gas by the stored heat in the presence of the blue water gas and excess steam from the fuel bed.

Usually the run period of the cycle is divided into an up-run, in which the steam passes upwardly through the fuel bed, the resulting up-run blue water gas being carburetted in its passage through carburetting vessels, such as a carburetter and superheater, and a down-run in which steam is passed downwardly through the fuel bed. The down-run is usually in the form of a back-run, in which steam is passed reversely through the carburetted water gas set, being superheated in passing through the carburetting vessels prior to being passed downwardly through the fuel bed. The resulting back-run water gas is led away directly from the base of the fuel bed. During the down or back-run step, hydrocarbon oil may or may not be introduced into the down or back-run steam and passed therewith downwardly through the fuel bed, in a procedure commonly called an oil "reforming" step.

An approximate measure of the coke which a petroleum oil will yield upon vaporization in carburetted water gas practice is the "Conradson carbon" of the oil as determined by the method described in A. S. T. M. Standard D189–41.

When a petroleum oil, such, for example, as gas oil, having a relatively low Conradson carbon, for example, of below 1 or 2%, is employed for enrichment, the usual practice has been to admit the oil during the up-run into a carburetter provided with refractory checkerbrick, which affords a large highly heated surface for the vaporization of the oil, the resulting mixed vapor phase being passed through a checkerbrick filled superheater for the continued cracking or "fixing" of hydrocarbon components thereof.

When heavy oil, having a relatively high Conradson carbon content, above approximately 2%, such, for example, as from 4 to 10 or 12% and higher, is employed for enrichment, the vaporization of the oil in a checkered carburetter becomes undesirable, due to the rapid plugging of the relatively narrow passages between the checkerbricks by deposited carbon. Since frequent interruptions of the normal cycle to burn out this carbon or to dispose of it otherwise very greatly reduce the gas making capacity of the apparatus, it became the usual practice, in the use of such heavy oil for enriching, to employ a carburetter substantially devoid of checkerbrick, at least down-stream from the zone of oil admission.

Since it is difficult to store sufficient heat in the refractory lining of the carburetter to effect the vaporization of all of the heavy oil usually required for enrichment, at the rate demanded by operation at high set capacities, it became a common practice to effect the vaporization of a part of the heavy enriching oil by spraying it on to the top of the generator fuel bed during the up-run.

This latter procedure would be desirable even if all of the heavy oil could be efficiently handled in the carburetter, since the coke produced on the vaporization of the oil becomes a part of the generator fuel bed, and materially reduces the quantity of solid fuel which must be charged thereto.

In contrast to this, heavy oil which is sprayed into the carburetter for vaporization therein deposits coke on the walls and floor thereof, on which surfaces its nuisance considerably outweighs any advantages it may have as fuel.

A principal object of the present invention is to increase the proportion of the heavy enriching and/or reforming oil, which may be admitted to the generator, with a reduction of coke deposition in the other portions of the set, and with increased utilization of oil coke as generator fuel.

The reduction of coke deposition in the carburetting vessels effects increased capacity in that it permits longer operation of the set without shut down for cleaning, since with modern mechanical grates the generators may be operated for long periods without shut down. There is an accompanied reduction in cleaning labor. The reduction of coke deposition improves the rate of heat transfer to and from the refractory heat storage material in the carburetting vessels, since the carbon acts as a heat insulator. This permits a greater proportion of run to blow in the cycle, with consequent further increase in set capacity. Inasmuch as the carburetter and superheater will operate more efficiently without a coating of carbon on their refractory surfaces, a reduction in carbon deposition therein reduces the vessel size required for a given quantity of oil employed per unit of gas produced. As to the carburetter, the reduction in oil vaporization therein permits a further reduction in size, with the possible elimination of any necessity for providing a carburetter in some cases.

However, full advantage cannot be taken of the addition of oil coke to the fuel bed and the reduction of carbon deposition elsewhere simply by admitting all of the heavy enriching oil to the generator top, in the manner in which part of the oil is admitted in present practice. In the usual methods of introducing heavy oil into the generator, it is merely heated to a temperature at which it can be readily handled, say 200° to 250° F. or somewhat higher. Under these conditions, 50% of the heavy enriching oil required for carburetting to a calorific power of, for example, 520 B. t. u. per cubic foot is about the upper limit of the proportion of the total enriching oil which may be so vaporized, in the case of a typical Bunker C oil of approximately 10% Conradson carbon. When employing usual methods, if it is attempted to vaporize a much greater proportion than this on the generator top, a relatively impervious gummy layer is produced thereon, which greatly impairs the porosity of the fuel bed. The very poor fuel bed conditions produced cause highly non-uniform gas flow with channelling and increased blowing-over of fuel, and result in the loss of gas-making efficiency and capacity.

In accordance with the present invention, the enriching oil, such, for example, as a heavy oil of relatively high Conradson carbon, prior to admission to the generator, is heated under sufficient pressure to maintain it as a liquid, for example by waste heat from the water gas set, to a temperature which is sufficiently elevated to effect the vaporization, by heat contained in the oil, of a considerable proportion thereof at the pressure in the generator top (which is usually but slightly above atmospheric pressure); and the oil, thus highly preheated, is admitted during the run into the upper portion of the generator, with the deposition of carbon resulting from the vaporization of the oil on and/or in the fuel bed.

It is preferred to store in the enriching oil, as preheat, at least a large proportion, such, for example, as approximately 60% or more, preferably in excess of 80% or even 90% of the total heat above 60° F. which is required to effect its vaporization, thereby very considerably reducing the quantity of heat which the generator top is required to expend on each gallon of oil introduced thereto, and very considerably increasing the quantity of oil which the generator top can efficiently handle per cycle.

In preheating such oil to the relatively high temperatures required, prior to its admission to the generator top, the time of exposure of the oil to such temperatures must be strictly limited in order to avoid excessive coke formation in the preheating apparatus.

The invention will be more particularly described in connection with the attached figures, which show somewhat diagrammatically forms of the apparatus of the invention, chosen for illustration.

Referring to the figures.

Figure 1:
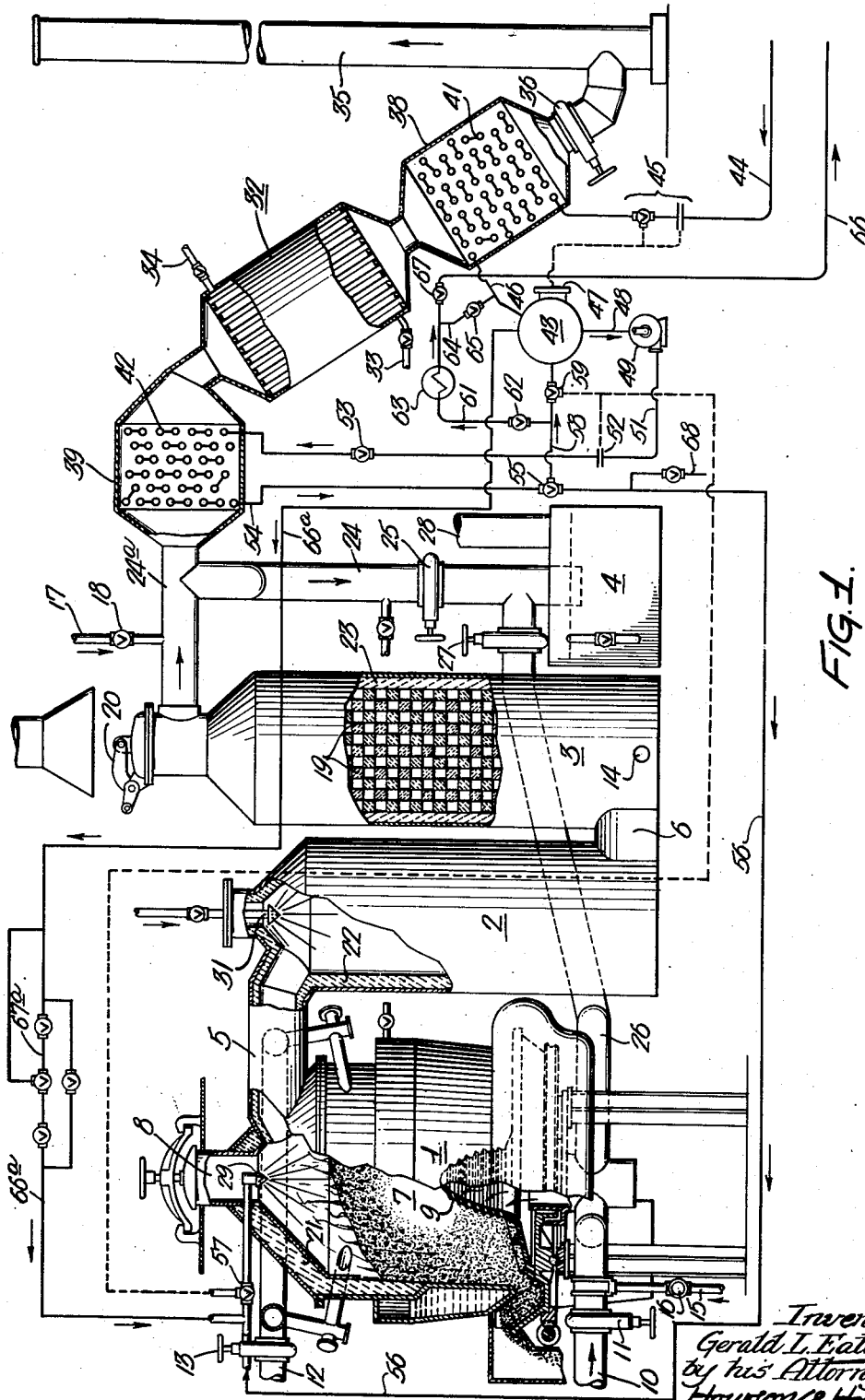
Figure 1 shows, partly in elevation and partly in vertical section, a carburetted water gas set illustrating a form of the invention.

Referring to Figure 1:

1 generally indicates a generator, 2 a carburetter, 3 a superheater, and 4 a wash-box of a carburetted water gas set. The generator, carburetter and superheater are illustrated as connected in series by means of the gas connection 5 leading from the top of the generator to the top of the carburetter and the gas connection 6 leading from the bottom of the carburetter to the bottom of the superheater.

The generator is illustrated as provided with the ignited fuel bed 7, which may be replenished through coal hole branch 8 and which is illustrated as supported by the mechanical grate 9, which is adapted to continually discharge ash and clinker from the generator base.

The generator is further illustrated as provided with the primary air supply means 10, furnished with valve 11, for air blasting the fuel bed upwardly through ports in the grate structure, and with secondary air supply means 12, furnished with valve 13, for admitting air for the combustion of the producer gas resulting from the primary air blasting. 14 indicates a tertiary air supply means which may be provided to complete the combustion of the blast gases.

15 indicates a steam supply means, provided with valve 16, for up-running through the fuel bed. 17 is a steam supply means, provided with valve 18, for back-running through the fuel bed.

The carburetter is illustrated as devoid of checkerbrick. The superheater is illustrated as provided with the checkerbrick filling 19, and the stack valve 20. The refractory linings of the upper part of the generator, the carburetter and the superheater are indicated at 21, 22 and 23 respectively. The up-run make gas take-off 24, provided with valve 25, leads from the top of the superheater to the wash-box, and the down or back-run gas take-off 26, provided with the valve 27, leads from the base of the generator to the wash-box. 28 indicates a gas take-off leading from the wash-box to condensing, purification, storage or other disposal.

The previously described features of Figure 1 are to be found in conventional carburetted water gas apparatus. In the use of such apparatus, with heavy oil for enrichment, the generator is conventionally provided with an oil spray, indicated at 29, for spraying heavy oil on to the top of the fuel bed and the carburetter with an oil spray, indicated at 31, for spraying finely divided heavy oil into its empty chamber.

Frequently in conventional carburetted water gas apparatus, the blast gases, instead of being discharged from the superheater through the superheater stack valve to the superheater stack, are passed from the superheater through a waste heat boiler, for the recovery of sensible heat from the gases, prior to their passage to the atmosphere through the boiler stack. In Figure 1, 32 indicates a waste heat boiler, supplied with feed water through line 33, and provided with steam take-off 34. 35 indicates the boiler stack, furnished with boiler stack valve 36.

In the apparatus illustrated in Figure 1, two oil heaters are provided, each having a fluid way which is arranged as a portion of the path of the blow gases from the superheater to the boiler stack. Low temperature oil heater 38 is positioned in the blow gas flow down-stream from the waste heat boiler, while high temperature oil heater 39 is positioned up-stream therefrom.

Oil heater 38 is provided with coil 41, through which the oil flows in heat exchange relation to the flow of blow gases passed through the heater after they have passed through the waste heat boiler. Oil heater 39 is provided with coil 42, through which the oil flows in heat exchange relation to the flow of blow gases prior to their passage through the waste heat boiler.

The coils of the oil heaters 38 and 39 are illustrated as connected in series by way of an accumulator 43 as will be described below.

Line 44, provided with the flow controller 45, is arranged to deliver oil, under suitable temperature conditions for ready handling and under a suitable pressure, from storage or other supply to the oil inlet of coil 41 of heater 38. The oil outlet of coil 41 of heater 38 is connected, by means of line 46, with accumulator 43, which is provided with a level controller 47, which is operatively connected with flow controller 45, so as to maintain, in known manner, a desired substantially uniform average level of oil in accumulator 43.

Accumulator 43 is further provided with connection 48 leading to the intake side of pump 49, the delivery side of the pump being connected to line 51, which leads through flow meter 52 and valve 53 to the inlet of coil 42 of heater 39.

The outlet of coil 42 is connected to line 54 which leads to the switch valve 55, which may be set to direct the flow of oil from heater 39 to the generator top by way of line 56, valve 57 and spray 29, or may be set to recirculate the oil from heater 39 through line 58 and valve 59 to the accumulator, or through line 61, valve 62 and cooler 63 either to the accumulator by way of line 64 and valve 65, or to storage through line 66 and valve 67, depending upon the appropriate setting of the several valves 59, 62, 65 and 67. 68 indicates a valved steam supply means for supplying purge steam to line 56. The cooler 63 may be provided with a flow of any desired cooling medium such, for example, as water through suitable connections (not shown).

Flow meter 52 is illustrated as operatively connected with valve 57 controlling the admission of oil to the set, when switch valve 55 is appropriately positioned, and also operatively connected with valve 59 which controls the flow of oil back to the accumulator, when valve 55 is reversed.

Connection 66a leads from the accumulator to the generator by way of valve 57 and spray 29, and serves to vent any gas, produced by cracking, which collects in the accumulator. The flow of gas into the generator, by way of line 66a, is illustrated as controlled by a back pressure regulator generally indicated at 67a.

The following is an illustrative operation of the apparatus of Figure 1 in accordance with the method of the invention:

With the superheater stack valve 20 closed and with the boiler stack valve 36 open, the ignited fuel bed in the generator is blasted with primary air supplied through air supply pipe 10, and the resulting producer gas, ignited with secondary air supplied to the generator top through air supply pipe 12, is burned while passing through the generator top, the carburetter and the superheater. Heat is thereby stored in the fuel bed, including its top, in the refractory linings of the generator top and carburetter, and in the refractory lining and checkerbrick of the superheater.

The blow gases issue from the superheater while still at relatively elevated temperature and pass in series through oil heater 39, waste heat boiler 32, oil heater 38, valve 36 and stack 35 to the atmosphere.

The blow gases are progressively cooled in heating the oil in heater 39, the water in boiler 32, and the oil in heater 38.

During the blow, switch valve 55 is positioned so as to shut off communication between the oil outlet of heater 39 and line 56 leading to the generator, and to connect the oil outlet of heater 39 with line 58 leading back to the accumulator 43 or back to storage.

Oil is delivered from storage, through line 44, at a suitable pressure and at a temperature at which it can be readily handled. The rate of flow to heater 38 is controlled by flow controller 45, which is reset by level controller 47 so as to maintain the desired average level in the accumulator over the cycle.

The oil flows continually through low temperature heater 38 and is heated therein to an intermediate temperature which tends to increase somewhat as the blow progresses.

Throughout the blow, oil is continuously recirculated from the accumulator by means of the hot oil pump 49, through line 51, flow meter 52, valve 53, high temperature heater 39, line 54, switch valve 55 and either back to the accumulator by way of line 58 and valve 59, which is controlled by flow meter 52, or by way of line 61, valve 62, cooler 63, line 64 and valve 65, or from the cooler back to storage through valve 67 and line 66.

The temperature of the oil leaving the heater 39 tends to increase as the blow proceeds, as does the temperature of the oil in the accumulator, depending of course upon the degree of diversion of oil through cooler 63, if any, and the degree of cooling therein.

The cooler and the return to storage are furnished to provide flexibility in the control of oil temperatures and will usually only be employed to the extent desirable to maintain oil temperature-time of exposure relationships at such values as to provide a high degree of oil preheat, without danger of excessive coke formation in the preheating apparatus.

The quantity of oil stored in the accumulator increases during the blow to a degree depending upon the adjustment of level controller 47 and flow controller 45.

The pressures, throughout the cycle, in the several parts of the preheating system are maintained sufficiently high to maintain the oil substantially in the liquid phase, under the temperature conditions obtaining therein.

At the end of the blow, the primary and secondary air blasts are shut off, valve 36 is closed, and with valve 25 open and valve 27 closed, an up-run is made with steam supplied to the base of the fuel bed through steam supply 15.

The resulting blue water gas issues from the top of the fuel bed and passes with the excess steam through the generator top, the carburetter and the superheater, to the wash-box by way of connection 24, and thence to storage through take-off 28.

A short time after the start of the up-run, switch valve 55 is operated to connect line 54, leading from oil heater 39, with line 56, leading to the generator, instead of with the recirculating line 58, and oil is pumped from the accumulator through heater 39 to the generator top, by way of lines 48 and 51, flow meter 52, line 54, line 56, valve 57 (which is controlled by flow meter 52) and spray 29.

The oil is maintained substantially in the liquid phase until it flows through valve 57.

In passing through valve 57 and spray 29, the oil pressure is reduced to that of the generator top, which is usually not greatly above atmospheric pressure, for example, a gauge pressure of approximately 30 inches of water. At the high temperature of the preheat, a large proportion of the oil in flashed to vapor by the heat stored in the oil. The portion of the oil remaining liquid is directed by the spray toward the top of the fuel bed on which the vaporization is completed by the heat stored in the generator top, with great rapidity due to the initial high temperature of the liquid residue. Because of this rapid distillation, the resulting coke becomes a part of the fuel bed without unduly impairing the porosity thereof, in spite of the fact that the flashing operation concentrates the Conradson carbon of the original oil in the residual liquid. The formation of an impervious gummy layer in conventional practice results from the relatively prolonged stewing of the oil on the top of the fuel bed. In the present invention, the formation of such a layer is inhibited by the great rapidity with which the remaining volatiles are removed from the liquid material reaching the fuel bed top.

The vapors flashed off from the entering oil stream and those produced immediately thereafter from the residual liquid are cracked in passage through the carburetter and superheater with the up-run water gas and excess steam, the resulting carburetted water gas passing by way of line 24 to the wash-box and to storage.

During the period of oil admission to the generator, the oil passing through the heaters is preheated by heat previously stored in the tubes thereof during the blow. If desired, the heaters, or either of them, may be provided with refractory heat storage material for storing additional heat during the blow, for transfer to the tubes and to the oil during the run.

During the period of oil admission to the generator, the temperatures of the oil at the outlets of heater 38, accumulator 43 and heater 39 tend to decrease somewhat, while the level of the oil in accumulator 43 tends to fall as controlled by level controller 47 and flow controller 45.

At the end of the up-run, the switch valve 55 is again reversed, to connect the outlet of oil heater 39 with the recirculating line 58, cutting off the flow of oil to the generator, except for the contents of line 56, which is purged into the generator top with steam supplied through pipe 68.

The up-run steam to the generator is shut off, valves 25 and 27 are reversed, and a back-run is made with steam supplied through pipe 17, the resulting back-run water gas passing through connection 26 to the wash-box and thence to storage.

During the back-run, in the particular cycle illustrated, oil is continually supplied through heater 38 to accumulator 43, and is continuously recirculated from the accumulator through heater 39 and back, as during the blow, except that the heating blow gases are not passing through the heaters, the heating of the oil being effected by stored heat.

During the back-run, the oil temperatures at the outlets of heaters 38 and 39 tend to continue to decrease, but the oil temperature at the outlet of the accumulator tends to increase, while the level of the oil in the accumulator increases also, as controlled by the level and flow controllers.

At the end of the back-run, the steam supply through pipe 17 is shut off, that through pipe 15 opened, and valves 25 and 27 are reversed. The operation effects a short uncarburetted up-run, and purges out the base of the generator and the back-run pipe 26, the resulting up-run water gas passing through the carburetter and superheater to the wash-box and thence to storage.

After the last up-run, the up-run steam is shut off, the primary air valve 11 is opened, and with the stack valves remaining closed, a blast purge is made, the unignited blast gases purging the water gas remaining in the set through the wash-box.

After the blast purge, the various valves are set for the "open" blow and the cycle is repeated.

During the last up-run and the blast purge, the oil flow through the heater 38 and the recirculation through accumulator 43 and heater 39 continues as during the back-run, with temperatures at the outlets of heaters 38 and 39 continuing to fall somewhat, and with the temperature at the outlet of the accumulator and the level of oil therein tending to increase the latter as controlled by the level and flow controllers.

The following is a specific example of the method of the invention as employed in carburetted water gas manufacture in apparatus similar to that of Figure 1, and with a cycle of set operation and oil preheating similar to that described above.

Length of cycle—4 minutes.

|  | Per cent of cycle |
|---|---|
| Open blow | 42 |
| Up-run | ¹ 30 |
| Back-run | 21 |
| Last up-run | 4 |
| Blast purge | 3 |

¹ Oil admission 29.

Approximate average temperatures of blow gases:

|  | °F. |
|---|---|
| High temperature oil heater— | |
| Gas inlet | 1400 |
| Gas outlet | 1200 |
| Low temperature oil heater— | |
| Gas inlet | 600 |
| Gas outlet | 500 |

Average blow gas production—30,000 cu. ft. per min. (taken as if measured at 60° F. and at 760 mm. Hg absolute pressure)

Oil employed—Bunker C oil having the following distillation and Conradson carbon and other characteristics.

| | |
|---|---|
| Water | Trace |
| Sp. Gr., 60° F | 0.978 |
| Sp. Gr., A. P. I | 13.8 |
| Vis. Sayboldt Furol 60 cc, 50° C.—Sec | 484 |
| Insoluble in benzol, percent by wt | 0.25 |
| Flashpoint—Pensky Martens, °F | 253 |
| Conradson Carbon, percent by wt | 10.1 |
| Ash, percent by wt | 1.28 |
| B. t. u. per lb | 18,547 |
| Sulfur, percent by wt | 0.82 |

| Distillation | Percent |
|---|---|
| °F | |
| 425–450 | 0.5 |
| 450–500 | 0.5 |
| 500–550 | 1.5 |
| 550–600 | 65.0 |
| 600–650 | 12.0 |
| 650–700 | 4.5 |
| Over 700 | 4.0 |
| Total | 88.0 |

Average oil feed to low temperature heater—29 gallons per minute at an average temperature of 250° F. and at a gauge pressure of 250 lbs. per square inch.

Average temperature of oil feed to accumulator—450° F.

Capacity of accumulator—gallons—1000

Average oil feed to generator during period of oil admission—87 gallons per minute at an average temperature of approximately 800° F. and an average gauge pressure of 200 lbs. per square inch, prior to expansion.

Approximate oil temperatures over cycle—°F.:

| | During Open Blow | During Oil Admission | During Remainder of cycle |
|---|---|---|---|
| Outlet of low temperature heater | 450→475 | 475→460 | 460→450 |
| Accumulator | 675→700 | 700→660 | 660→675 |
| Outlet of high temperature heater | 750→825 | 825→775 | 775→750 |
| Time of Exposure of oil to temperature as high as 800° F | (1) | (1) | (1) |

[1] Approximately 20 secs.

Make—12,200 cubic feet per minute (taken as if measured at 60° F. and 760 mm. Hg absolute pressure) of carburetted water gas of approximately 500 B. t. u. per cu. ft.

Figure 2:
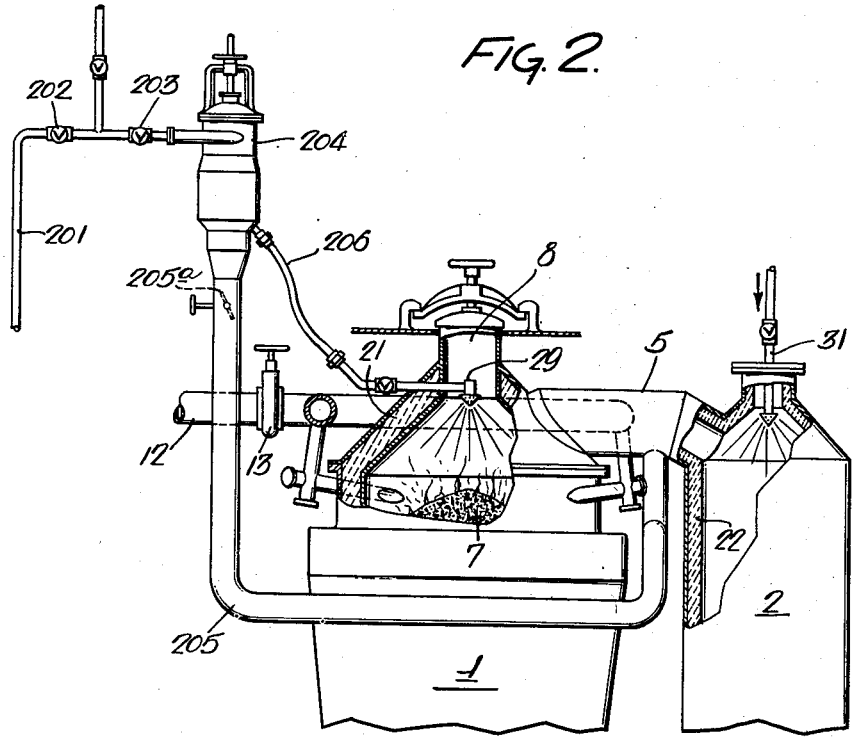
Figure 2 shows, partly in elevation and partly in vertical section, a modification of the apparatus of Figure 1.
Figure 3:
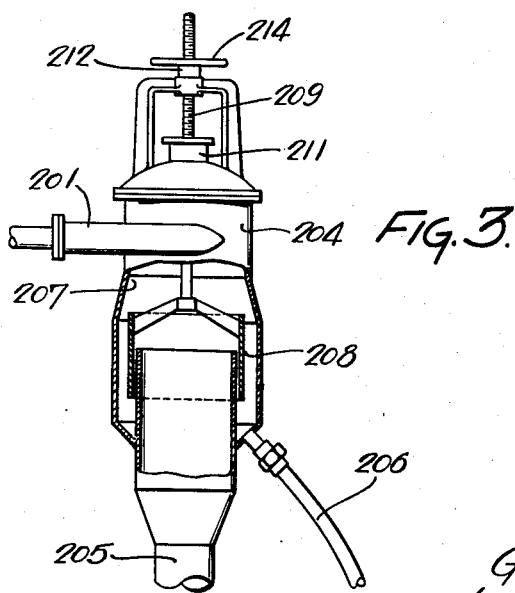
Figure 3 shows, partly in elevation and partly in vertical section, an enlarged view of a portion of the apparatus of Figure 2.

Referring to Figures 2 and 3:

Figure 2 shows a portion of the carburetted water gas set of Figure 1, together means for flashing the preheated oil and for introducing the resulting phases into the set. Figure 3 shows an enlarged view of the phase separator illustrated in Figure 2. Means identical with those shown in Figure 1 are indicated by the same numbers as in Figure 1.

1 is the generator and 2 the carburetter connected at their tops by gas connection 5. 12 indicates the secondary air supply provided with valve 13, for introducing secondary air into the generator above the fuel bed. 7 indicates the fuel bed, 8 indicates the generator coal hole branch and 29 the generator oil spray, while 31 is the carbureter oil spray. 21 and 22 indicate the refractory linings of the generator top and the carburetter. These features are as illustrated in Figure 1, as the remainder of the set may be also.

Line 201, provided with shut-off valve 202 and expansion valve 203, leads to the vicinity of the generator top from the oil preheating means (not shown).

Down-stream from expansion valve 203, line 201 leads tangentially into the phase separator 204, from which the separated gas phase is discharged by way of gas connection 205, provided with butterfly valve 205a, and by way of connection 5 into carburetter 2.

The separated liquid phase together with a portion of the gas phase is discharged by way of connection 206 and spray 29 into the generator top, the residual liquid being directed onto the top of the fuel bed.

Line 201 down-stream from the expansion valve 203 is illustrated as entering the upper portion of the phase separator tangentially, so as to swirl the entering mixed gas and liquid material within the separator chamber 207. The adjustable sleeve 208, slidably fitting around the end of gas take-off connection 205, may be raised or lowered by means of the rod 209. This rod passes through the stuffing box 211 and is provided with a threaded portion 212 engaging threads in support 213, thus providing for up and down movement of the rod and sleeve by turning the handle 214. The chamber 207 is arranged so that raising or lowering the sleeve, decreases or increases respectively the annular space between the sleeve and the inner wall of the chamber.

In the operation of the apparatus of Figures 2 and 3, during the oil admission period or periods of the cycle, the highly preheated oil flowing through the expansion valve 203 into the lower pressure zone of the phase separator chamber 207, is flashed into a mixture of oil vapor and residual liquid. As this mixture is swirled within the chamber of the separator, the residual liquid is thrown toward the periphery of the chamber by centrifugal force, and thereafter flows downwardly between the chamber wall and sleeve 208 to the liquid line 206, leading to the generator oil spray 29.

By adjustment of the sleeve 208 and the butterfly valve 205a, any suitable subdivision of the vapor phase may be made between that separately introduced and that introduced into the generator top with the residual liquid to ensure the desired distribution of the liquid onto the top of the fuel bed.

The adjustment is preferably such that only a crude separation of the oil vapor from the residual liquid is effected, thereby passing a considerable proportion of the oil vapor into the generator with the separated residual liquid.

The previously described carburetted water gas set operation and oil preheater operation have been given for the purpose of illustration. As will be understood by those skilled in the art, it may be widely varied as to the proportion and arrangement of cycle steps and as to the specific cycle steps employed.

Oil may be introduced into the generator, if desired, during a down or back-run and reformed in passage through the fuel bed. Blow-runs may be employed, if desired, in either upward air blasting or in down or back-blasting steps, and oil may be admitted to the generator during a blow run.

Those skilled in the art will readily understand how the water gas set illustrated in the figures may be modified, if required, for the performance of these and other cycle operations.

When practicable, it is preferred to preheat the oil sufficiently to permit the introduction to the generator of all of the oil which is introduced to the set in the liquid phase. It will be readily understood, however, that even when preheating the oil to relatively high temperatures, as previously described, it may be necessary to introduce a portion of the liquid oil elsewhere, such, for example, as to the carburetter, particularly when the introduction of relatively large quantities of oil per hour is required.

Further, while it is preferred to preheat to a relatively high temperature substantially all of the oil required, it will be readily understood that some of the advantages of the invention may be obtained, even through a portion of the oil is not so preheated.

It is preferred to introduce the secondary air to the generator above the fuel bed and to effect this introduction tangentially, as is illustrated in Figures 1 and 3. The tangential entrance swirls the fresh secondary air in contact with carbon which may be deposited on the generator lining and by the combustion thereof inhibits its accumulation. Other methods of introducing secondary air to the set, however, may be employed.

Although oil preheating, of the character described, is thought to be most advantageously employed in connection with the operation of a carburetted water gas set having a mechanical grate which is capable of extended operation without shut-down, the invention is not necessarily thus limited. However, the use of a mechanical grate has advantages in addition to those previously set forth. Its continual operation effects a relatively uniform descent of the fuel bed, which cooperates in maintaining the uniform porosity thereof. The continual movement of the grate opposes the formation and maintenance of channels in the lower portion of the fuel bed and thereby aids in the uniform distribution of the hot gases through the fuel bed top. This cooperates with the storage of heat in the fuel bed by the secondary combustion of the blast gases and with the high temperature preheating of the oil to effect the desired rapid and uniform distillation of the oil residues on the fuel bed top, thereby inhibiting the formation and growth of masses in the upper portion of the fuel bed, which are impervious to gas flow.

Although the use of two oil heaters, heated in series by waste gases, has been specifically described above, the invention is not limited to any particular number or arrangement of heaters, nor to the employment of waste heat from a water gas set, or otherwise, as the method of heating.

In the case of other methods of heating, such, for example, as separate firing, it may still be advantageous to employ low temperature and high temperature heaters with an accumulator interposed in the oil flow therebetween, as illustrated in Figure 1. On the other hand, whether the heating is to be by waste heat or not, a single oil heater may be employed, if desired.

It will be readily understood in the case of other methods of heating, such as separate firing, heating gases may pass through the oil heater or heaters during the period or periods of the cycle when the highly preheated oil is being introduced into the set. This may also be possible in cases in which the oil is preheated by means of blow gases, where a number of sets are running in "stepped" operation, the oil preheated by the blow gases of one set during its blow period being introduced into another set, during the make period of the latter.

In preheating oil, in accordance with the present invention, to temperatures which are relatively elevated with respect to the temperature required for mere handling, it is preferred to carry the preheating to an average temperature above approximately 650° F., preferably above 700° F., such as between 750° F. and 950° F. Average temperatures between approximately 775° F. and 825° F., such as, for example, in the neighborhood of 800° F., are particularly suitable.

The pressure conditions in the preheating apparatus will depend upon the vapor pressure characteristics of the particular oil employed, the preheating being conducted under sufficient pressure to maintain the oil substantially as a liquid during the preheating operation.

The time of exposure of the oil to relatively high temperature conditions is preferably strictly limited to avoid undue coke formation in the preheating apparatus. The particular length of time to which a given heavy oil may be subjected to elevated temperatures in the preheating apparatus without the danger of undue coke formation, depends upon the temperature and the character of the oil.

Since various oils differ very widely in coke forming characteristics when heated to the temperatures involved in the preheating operations set forth herein, it is not possible to specify ranges of temperature and time of exposure, which will not result under some conditions of operation with some oils, in undesirable coke formation, without, at the same time, excluding conditions of highly desirable operation with other oils.

In general, other conditions being the same, the higher the temperature, the longer the time of exposure and the higher the Conradson carbon content of the oil, the greater the danger of excessive coke formation. Keeping such factors in mind, the skilled operator can readily control the temperature-time of exposure variables with regard to the particular oil employed to avoid undue coke formation in the preheating apparatus. Times of exposure at temperatures as high as 800° F., up to 300 seconds are mentioned as suitable in the preheating of certain carburetting oils. Such times of exposure are purely illustrative, since with other oils the higher portion of this range may result in excessive formation of coke during preheating. Times of exposure between, for example, 10 sec. and 50 sec. such, for example, as between 15 and 25 sec., may be readily secured in apparatus of suitable design.

Many modifications of the apparatus and process of the invention as described above will readily occur to those skilled in the art without departing from the spirit of the invention, which is only intended to be limited as the appended claims may require.

I claim:

1. In the cyclic blow and run method of manufacturing carburetted water gas in which blue water gas generated in an ignited fuel bed during a run period of the cycle is carburetted with hydrocarbon oil gasified by the aid of heat stored in a heat storage zone including the top of said fuel bed during a previous blow period of the cycle; the improvement comprising preheating said carburetting oil in stages under pressure conditions sufficiently elevated to maintain said oil substantially in liquid phase, and to a temperature sufficiently high to cause the evaporation of a considerable part thereof by reason of its preheat upon reduction of its pressure to approximately that of said heat storage zone, by passing said oil through a relatively low temperature oil-preheating zone and thereafter through a relatively high temperature oil-preheating zone, said oil being passed continuously through said low temperature oil-preheating zone into a hot pressure-storage zone, being recirculated between said storage zone and said high temperature oil-preheating zone during non-carburetting portions of the cycle, and being delivered from said high temperature oil-preheating zone during a carburetting period of the cycle and flashed into a relatively low pressure zone in gas communication with the top of said fuel bed, so as to admix the resulting vapor phase hydrocarbon material with the blue water gas being simultaneously generated, and so as to deposit highly heated residue from said flashing upon the top of said fuel bed for further heating thereon.

2. A process according to claim 1, in which the oil preheating is effected in said low temperature and high temperature oil-preheating zones by heat transfer from hot waste products of combustion discharged from the oil gasifying heat storage zone during the blow portion of the cycle.

3. A process according to claim 1, in which the oil preheating is effected by waste heat in the hot products of combustion discharged from the oil gasifying heat storage zone during the blow portion of the cycle, said high temperature oil-preheating zone and said low temperature oil preheating zone being arranged in series in the path of the flow of said combustion products downstream from said oil gasifying zone, with a steam generating zone arranged between said oil-preheating zones in the flow of said combustion products.

4. A process according to claim 1, in which the flow of oil through said low temperature oil-preheating zone is automatically controlled to maintain a predetermined average oil level in said oil storage zone throughout the cycle.

5. A process according to claim 1 in which a predetermined maximum temperature is maintained in said oil storage zone by circulating oil from said storage zone through a cooling zone upon rise of temperature of said oil in said storage zone above a predetermined temperature.

6. In the cyclic blow and run method of manufacturing carburetted water gas in which blue water gas generated in an ignited fuel bed during a run period of the cycle is carburetted with heavy carburetting oil gasified by the aid of heat stored during a previous blow period of the cycle; the improvement comprising preheating said heavy carburetting oil under pressure conditions sufficiently elevated to maintain said oil substantially in liquid phase and considerably above the pressure conditions obtaining in the zone of oil gasification, and to a temperature considerably above the boiling point of a large part of said oil and sufficiently high to cause the evaporation of a considerable portion thereof by the preheat upon reduction in the pressure thereon to approximately that obtaining in said oil gasification zone during a carburetting period of the cycle subjecting the preheated oil to flash vaporization by means of its preheat and reduction in pressure, centrifugally separating residue from said flash vaporization from the resulting vapor phase, depositing the hot separated residue upon the top of said fuel bed for coking thereon, and admixing the vapor phase with blue water gas simultaneously generated to carburet the same.

7. In apparatus for the cyclic blow and run manufacture of carburetted water gas which includes a carburetted water gas set provided with generator adapted to contain an ignited fuel bed; a relatively low temperature oil preheater with means for heating the same, oil supply means for delivering carburetting oil to be preheated under elevated pressure to the oil inlet of said preheater, a connection for leading preheated oil under elevated pressure from the oil outlet of said preheater to a storage vessel adapted to store hot oil under elevated pressure, means for delivering preheated oil under elevated pressure from said storage vessel to the oil inlet of a relatively high temperature oil-preheater provided with heating means, said pressure-storage vessel being connected intermediate said preheaters in the series flow of oil from said low temperature preheater to said high temperature preheater, a valve controlled connection for recirculating hot oil under elevated pressure from the oil outlet of said high temperature preheater to said storage vessel, a valve controlled connection for passing hot oil under elevated pressure from the oil outlet of said high temperature preheater to said carburetted water gas set, means for reducing said oil pressure to cause flash vaporization of said oil by the heat content thereof, and delivery means for discharging the vapor phase and residue of said vaporization into said carburetted water gas set to carburet run gas simultaneously generated therein.

8. In apparatus for the cyclic blow and run manufacture of carburetted water gas including a carburetted water gas set having a generator adapted to contain an ignited fuel bed; a relatively low temperature tubular oil-preheater with means for heating the same, oil supply means for delivering carburetting oil under elevated pressure to the oil inlet of said preheater, a connection for leading preheated oil under elevated pressure from the oil outlet of said preheater to a vessel adapted to store hot oil under elevated pressure, means for delivering preheated oil under elevated pressure from said storage vessel to the oil inlet of a relatively high temperature tubular oil-preheater provided with heating means, said pressure-storage vessel being connected intermediate said preheaters in the series flow of oil from said low temperature preheater to said high temperature preheater, a valve controlled connection for returning preheated oil under elevated pressure from said high temperature preheater to said storage vessel, a valve controlled connection for delivering preheated oil under elevated pressure from the oil outlet of said high temperature preheater to said carburetted water gas set and provided with pressure reducing and delivery means adapted for the flash vaporization of said oil with the discharge of vapor phase into said set while depositing residue from said vaporization upon the fuel bed top.

9. In apparatus according to claim 8, means for controlling the flow of oil to said low temperature preheater in response to variations in level of oil in said storage vessel to maintain a predetermined average oil level in said vessel throughout the cycle of operation of said carburetted water gas set.

10. Apparatus according to claim 8, in which fluid ways of said high temperature and low temperature oil preheaters are arranged in series in the order recited in the flow of hot waste air blast gas from said set, said fluid ways being in heat transfer relation to the tubes of said preheaters.

11. In apparatus according to claim 8, means responsive to the pressure in said storage vessel for venting into said set gas accumulating in said storage vessel by reason of the cracking of said oil during preheating.

12. Apparatus according to claim 8, provided with means for controlling the rate of flow of oil to said set during carburetting periods of the cycle and the rate of flow oil back to the storage vessel during non-carburetting periods of the cycle in response to the rate of flow of oil from said storage vessel to said high temperature preheater.

13. In apparatus for the cyclic blow and run manufacture of carburetted water gas which includes a carburetted water gas set provided with a generator adapted to contain an ignited fuel bed and provided with refractory heat storage material adapted to store heat of the blow gases and to provide an oil pyrolyzing zone for carburetting the run gas; means for flowing hot blow gases from said heat storage zone in series through a relatively high temperature oil-preheater, a waste heat boiler, and a relatively low temperature oil preheater; said blow gases flowing in fluid ways around the tubular ways of said preheaters in heat transfer relation thereto; means for delivering oil to be preheated under elevated pressure to the oil inlet of said low temperature preheater for passage through the tubular way thereof; a connection for delivering preheated oil under elevated pressure from the oil outlet of said low temperature preheater to a storage vessel adapted to store hot oil under elevated pressure; means for delivering preheated oil under elevated pressure from said storage vessel to the oil inlet of said high temperature preheater for passage through the tubular way thereof; said pressure-storage vessel being connected intermediate said preheaters in the series flow of oil from said low temperature preheater to said high temperature preheater, a valve controlled connection for recirculating hot oil under elevated pressure from the oil outlet of said high temperature preheater to said storage vessel; a valve controlled connection for passing hot oil under elevated pressure from the oil outlet of said high temperature preheater to said carburetted water gas set; means for reducing the pressure of said hot oil to cause flash vaporization thereof by the preheat therein; and delivery means for discharging the resulting oil vapor into said set for carburetting run gas therein, while depositing on the top of said fuel bed hot residue from said vaporization.

14. In a cyclic blow and run method of manufacturing carburetted water gas in which blue water gas generated in an ignited fuel bed during a run period of the cycle is carburetted in passage through an oil gasification zone with heavy carburetting oil by the aid of heat stored in said oil gasification zone during the previous blow period of the cycle, the improvement which comprises the stage-wise preheating of said heavy oil prior to its introduction into said oil gasification zone by the passage thereof in series through a relatively low temperature preheating zone, an intermediate temperature pressure-storage zone and a relatively high temperature preheating zone under pressure conditions sufficiently elevated to maintain said oil substantially in liquid phase throughout the preheating operation, and to a temperature sufficiently elevated to store in said oil as preheat the greater part of the heat above 650° F. required for the vaporization of said oil under the lower pressure conditions obtaining in said oil gasification zone, said oil being passed continuously through said low temperature preheating zone into said intermediate temperature pressure-storage zone; and, during non-carburetting periods of the cycle, being continuously recirculated from said pressure-storage zone through said high temperature preheating zone; and, during a carburetting period of the cycle, being passed from said high temperature preheating zone into said oil gasification zone with the flashing of said oil by said preheat upon the resulting reduction in pressure thereon, with the admixture of the resulting vapor phase with the blue water gas simultaneously being generated, and with the deposit on said fuel bed of highly heated residue from said flashing.

15. In a cyclic blow and run method of manufacturing combustible gas in which during a run period of the cycle oil is gasified in passage through an oil gasification zone by the aid of heat stored in said oil gasification zone during the previous blow period of the cycle, the improvement which comprises the stage-wise preheating of said oil prior to its introduction into said oil gasification zone by the passage thereof in series through a relatively low temperature preheating zone, and intermediate temperature pressure-storage zone and a relatively high temperature preheating zone under pressure conditions considerably above those obtaining in said oil gasification zone and sufficiently elevated to maintain said oil substantially in liquid phase throughout the preheating operation and to a temperature sufficiently elevated to cause the flashing of a considerable proportion of the preheated oil upon reduction in pressure to that obtaining in said oil gasification zone; said oil being passed continuously through said low temperature preheating zone into said intermediate temperature pressure-storage zone; and, during non-carburetting periods of the cycle, being continuously recirculated from said pressure-storage zone through said high temperature preheating zone; and, during a carburetting period of the cycle, being passed from said high temperature preheating zone into said oil gasification zone with the flashing of at least a considerable proportion of said oil by said preheat upon the resulting reduction in pressure thereon.

GERALD L. EATON.

REFERENCES CITED

The following references are of record in the file of this patent:

UNITED STATES PATENTS

| Number | Name | Date |
| --- | --- | --- |
| 1,651,115 | Clark et al. | Nov. 29, 1927 |
| 1,745,454 | Schwartz | Feb. 4, 1930 |
| 1,876,965 | Kopp | Sept. 13, 1932 |
| 1,973,377 | Gordon | Sept. 11, 1934 |
| 1,996,167 | Nagel | Apr. 2, 1935 |
| 2,009,092 | Mekler | July 23, 1935 |
| 2,017,243 | Gibson | Oct. 15, 1935 |
| 2,026,120 | Black | Dec. 15, 1935 |
| 2,067,940 | Nagel | Jan. 19, 1937 |
| 2,091,240 | Johnson et al. | Aug. 24, 1937 |
| 2,247,336 | O'Keeffe | June 24, 1941 |
| 2,397,138 | Haug | Mar. 26, 1946 |

OTHER REFERENCES

Morgan: "A Textbook of American Gas Practice," vol. I, 2nd edition (1931), page 545.